United States Patent [19]

Herr et al.

[11] 3,891,838

[45] June 24, 1975

[54] SYSTEM OF TESTING LINES OF A COMMUNICATION SWITCHING SYSTEM

[75] Inventors: Kurt F. Herr, Woodridge; Dennis A. Heck, Franklin Park; Lucian J. Lesny, Addison; Ronald L. Ward, Palatine, all of Ill.

[73] Assignee: GTE Automatic Electric Laboratories Incorporated, Northlake, Ill.

[22] Filed: June 15, 1973

[21] Appl. No.: 370,576

[52] U.S. Cl. .................. 235/153 AK; 179/175.2 R
[51] Int. Cl. .......................................... H04m 3/26
[58] Field of Search. 179/175.1 R, 175.11, 175.2 R, 179/175.2 C, 175.2 D, 175.3; 235/153 AK, 153 R

[56] References Cited

UNITED STATES PATENTS

| | | | |
|---|---|---|---|
| 3,506,794 | 4/1970 | Chulak | 179/175.2 R |
| 3,692,961 | 9/1972 | Strat et al. | 179/175.2 D |
| 3,700,830 | 10/1972 | Naylor | 179/175.2 D |
| 3,783,255 | 1/1974 | Buedel et al. | 235/153 AK |

*Primary Examiner*—Charles E. Atkinson

[57] ABSTRACT

A line testing arrangement is adapted for use in a communication switching system having a switching network and register apparatus for receiving call processing information from a calling line via the switching network and a register junctor. The system includes a data processor for translating call processing information and for controlling the switching network to establish connections between calling and called lines. The testing arrangement includes a manual test unit which initiates testing of a selected line, and line test adapting apparatus responds to an initiation signal provided by the manual test unit to effect the establishment of a connection to a first register junctor to enable call processing information, indicative of the selected line, to be supplied from the manual test unit to the register apparatus for establishing a connection to the selected line from the manual test unit. A trunk interrupt signal generator responds to an in-test signal provided by the manual test unit for generating an interrupt signal for the data processor to enable it to establish a connection over the switching network between the selected line and a second register junctor. The connection between the selected line and the line test adapting apparatus is maintained during the test to enable in-testing operations to be performed.

5 Claims, 8 Drawing Figures

SYSTEM OF TESTING LINES OF A COMMUNICATION SWITCHING SYSTEM

BACKGROUND OF THE INVENTION

1. Field of the Invention

This invention relates to testing arrangements for communication switching systems, and more particularly, to an out and in testing arrangement which employs existing apparatus of the communication switching system.

2. Description of the Prior Art

In communication switching systems, such as telephone systems, for example, it is generally necessary to test line circuits to allow verification of customer complaints such as lack of or low dial tone, inability to reach certain directory numbers, etc.

Prior art line testing apparatus required a separate testswitch train to permit call processing techniques for the line to be simulated under test conditions.

It would be desirable to have a line testing arrangement wherein lines are tested over network equipment employed for normal call processing which permits both out-testing and in-testing.

SUMMARY OF THE INVENTION

The object of this invention is to provide a new and improved line testing arrangement which enables out and in testing of lines over normal call processing apparatus.

CROSS-REFERENCE TO RELATED APPLICATIONS

The preferred embodiment of the invention is incorporated in a PROCESSOR CONTROLLED COMMUNICATION SWITCHING SYSTEM, U.S. Pat. application Ser. No. 130,133 filed Apr. 1, 1971, now abandoned by K. E. Prescher, R. E. Schauer and F. B. Sikorski, and a continuation-in-part thereof Ser. No. 342,323 filed Mar. 19, 1973, now U.S. Pat. No. 3,835,260 hereinafter referred to as the SYSTEM application. The system may also be referred to as No. 1 EAX or simply EAX.

The memory access, and the priority and interrupt circuits for the register-sender subsystem are covered by U.S. Pat. application Ser. No. 139,480 filed May 3, 1971, now U.S. Pat. No. 3,729,715 by C. K. Buedel for a MEMORY ACCESS APPARATUS PROVIDING CYCLIC SEQUENTIAL ACCESS BY A RESISTOR SUBSYSTEM AND RANDOM ACCESS BY A MAIN PROCESSOR IN A COMMUNICATION SWITCHING SYSTEM, now U.S. Pat. No. 3,729,715, hereinafter referred to as the REGISTER-SENDER patent application. The Executive Program for the central processor is covered by U.S. Pat. application titled STORED PROGRAM CONTROL IN A COMMUNICATION SWITCHING SYSTEM, Ser. No. 347,281 filed Apr. 2, 1973 by A. A. Kalat, E. F. Wodka, A. W. W. Clay and P. R. Harrington. The Computer Line Processor for operationally connecting the marker interrupt or sense lines to the central processor is covered by U.S. Pat. application titled SENSE LINE PROCESSOR WITH PRIORITY INTERRUPT ARRANGEMENT FOR DATA PROCESSING SYSTEMS, Ser. No. 347,966 filed Apr. 4, 1973 by L. V. Jones and P. A. Zelinski now U.S. Pat. No. 3,831,151.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and also in U.S. Pat. applications Ser. No. 281,586 filed Aug. 17, 1972, now U.S. Pat. No. 3,806,659, by J. W. Eddy for an INTERLOCK ARRANGEMENT FOR A COMMUNICATION SWITCHING SYSTEM, and Ser. No. 303,157 filed Nov. 2, 1972, now U.S. Pat. No. 3,809,822, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. Pat. application Ser. No. 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION, now U.S. Pat. No. 3,814,859 hereinafter referred to as the COMMUNICATIONS REGISTER patent application.

The automatic test system is disclosed in the following copending U.S. applications: U.S. Pat. application Ser. No. 370,562, filed June 15, 1973, now abandoned by K. F. Herr et al.; U.S. Pat. application Ser. No. 370,509, filed June 15, 1973 by L. J. Lesny et al.; U.S. Pat. application Ser. No. 370,577 filed June 15, 1973 by L. J. Putchinski, now abandoned in favor of continuation-in-part application Ser. No. 446,431, filed Feb. 27, 1974, now abandoned; U.S. Pat. application Ser. No. 370,561, filed June 15, 1973 by D. Heck et al. now abandoned.

The foregoing patents and applications are incorporated herein and made a part hereof as though fully set forth.

DESCRIPTION OF THE PREFERRED EMBODIMENT

General Description

Figure 1:
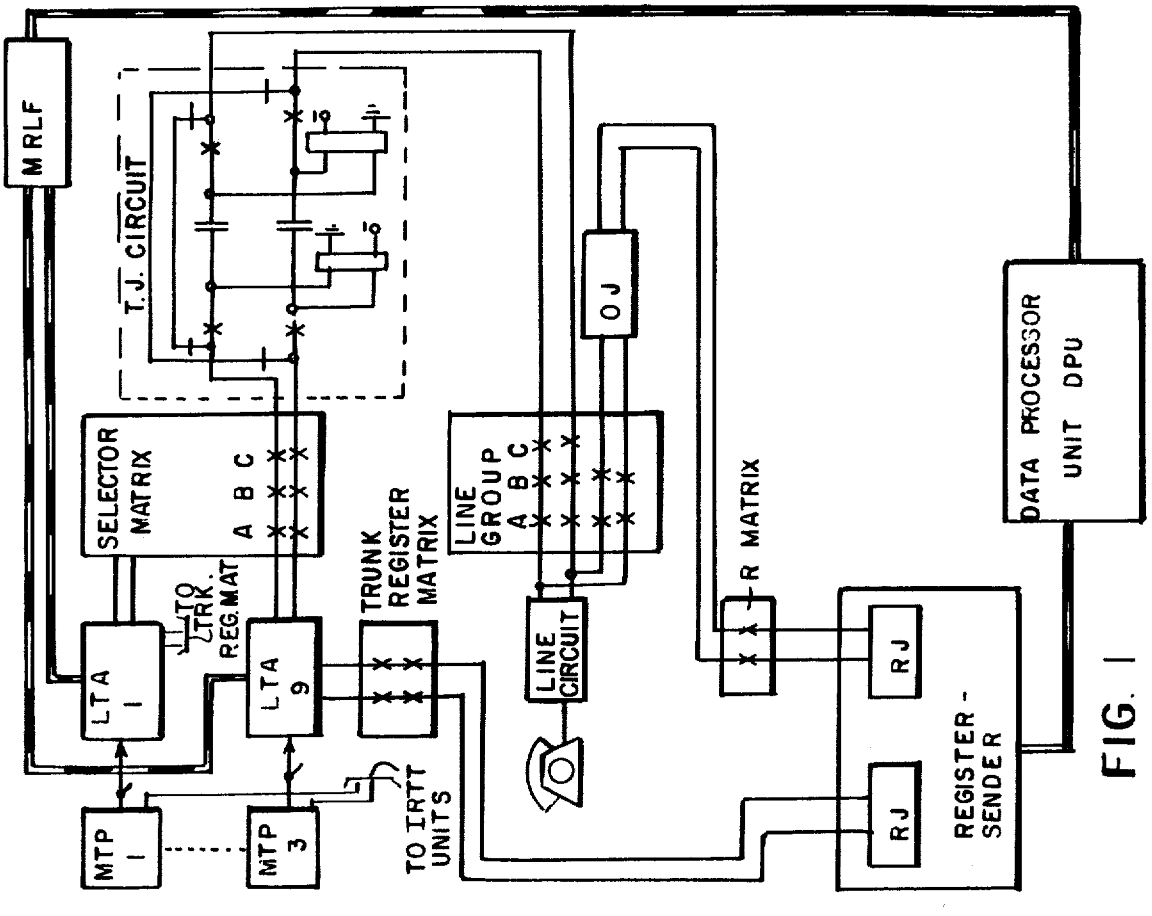
FIG. 1 is a simplified block diagram of a communication switching system showing a line testing arrangement provided by the present invention.

Referring to FIG. 1, there is shown a simplified block diagram of a communication switching system incorporating the line testing arrangement of the present invention. The manner in which the communication switching system provides call processing operations to establish connections between a calling party and a called party is described in detail in the foregoing applications incorporated herein and made a part hereof by reference.

In accordance with an exemplary embodiment of the invention, the line testing arrangement may include three local test panels MTP1–MTP3 each of which may have associated therewith three line access trunks LTA and five incoming remote test trunks IRTT.

The line testing circuits access the communication system via the selector matrix which is also used for normal call processing. The test connections are extended from the selector matrix over the normal terminating portion of the call processing apparatus including the terminating junctor TJ, the line group, an originating junctor, a register matrix R and the register sender RS.

An "out-test" is initiated when a test man seizes a line test access trunk LTA and keys the directory number of the line to be tested, for example. The digits of such directory number are received by the call terminating portion of the call processing apparatus in the normal manner and a connection is established from the line test access trunk LTA to the line to enable "out-testing" from the test panel MTP.

In accordance with the present invention, the line testing arrangement also permits "in-tests" to be made on the line using normal call processing apparatus. A trunk interrupt signal is set to the data processing unit via the line test access trunk LTA and the maintenance routining logic frame MLRF causing a register junctor to be seized to enable a connection to be established between the register junctor and the line being tested while the connection between the line and the line test access trunk is maintained. Accordingly, the testman can dial or lay digits as if originating from the subscriber line being tested.

Figure 2:
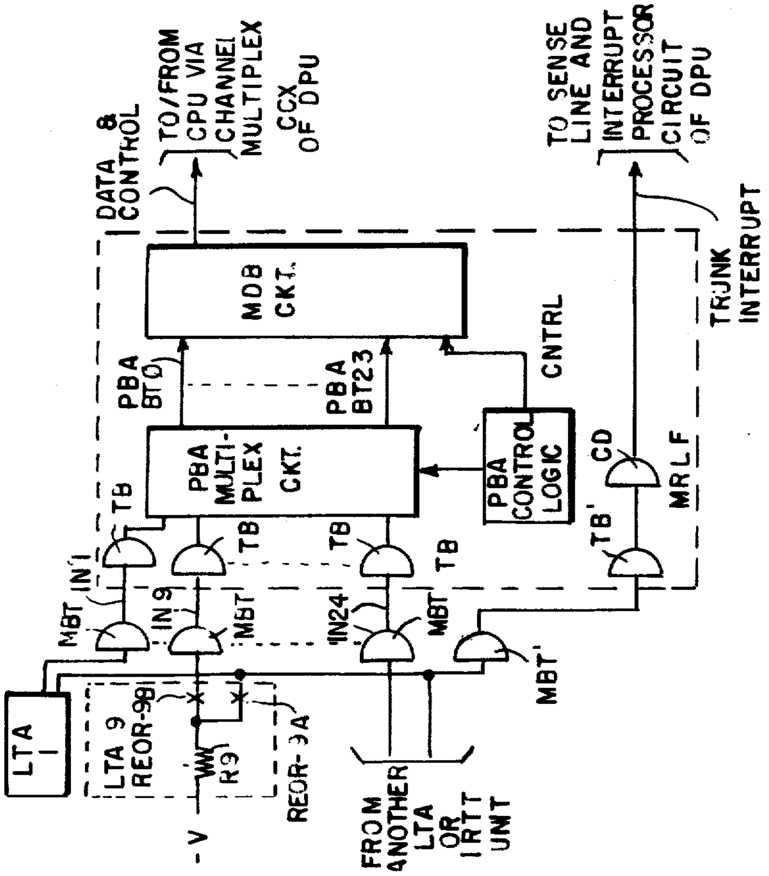
FIG. 2 is functional block diagram of a portion of the line testing arrangement shown in FIG. 1.

Referring to FIG. 2, which is a functional block diagram of a portion of the line testing arrangement, including a simplified showing of the line trunk access circuits LTA and the maintenance routining logic frame MLRF, each line test access trunk LTA and each incoming remote test trunk IRTT includes a pair of normally-open contacts, such as contacts REOR-9A, REOR-9B for trunk LTA9.

Whenever a trunk LTR or a trunk IRTT is seized, a trunk interrupt signal is provided by one set of contacts REOR-A, such as contacts REOR-9A of trunk LTA-9, which are closed to extend a voltage-V over associated resistor R9 to a common interface gate MBT', test buffer TB' and a cable driver CD to a sense line and interrupt processor circuit of the data processing unit DPU.

Each set of contacts, such as contacts REOR-9B are connected to be operable to extend a voltage -V over a resistor R9, contacts REOR-9B to an individually associated interface gate MBT and test buffer TB to a separate input of a multiplex circuit PBA. In the present example, where nine test access trunks LTA and fifteen remote trunks IRTT, the multiplex circuit PBA has 24 inputs and provides outputs PBA-BTO through PBA-BT23. The outputs of the multiplex circuit PBA are extended to separate inputs of a device buffer MDB which provides data and control outputs to and receives inputs from the central processor via a channel multiplex CCR of the data processing unit DPU.

Whenever a line test access trunk LTA is seized, its associated contacts REOR-B are operated, extending a signal over the multiplex PBA and the device buffer MDB to the central processor to permit identification of the trunk LTA which has been seized and has provided the trunk interrupt signal.

Out And In Testing

When a testman seizes a line test access trunk LTA or incoming remote test trunk IRTT (not shown but is similar to the circuit LTA), this trunk originates a call for service. An originating marker (not shown) establishes a network path from the LTA to a register junctor by closing the appropriate contacts in the trunk register matrix, and at the same time notifies the data processor unit DPU that this call originates from a LTA which requires special processing.

When the junctor RJ of the register sender is ready to receive digits, it provides a START DIAL indication to the test panel.

The testman, using his TCMF-keyset at the test desk, keys in either the directory number of the line to be tested or, in some cases, keys in the equipment number of the line to be tested.

In contrast to regular calls, the line circuit identity is retained in memory of the data processor unit DPU.

As soon as the complete number is received, the computer instructs a terminating marker TM to establish the terminating path from the unit LTA to the selected line circuit, using a terminating junctor TJ in the metallic cut-through mode to provide a direct metallic connection through the terminating junctor TJ. The call processing software program of the unit DPU stores within a memory word the test trunk identity and the identity of the line to which the test trunk has been connected.

The foregoing connections constitute an "out-test" connection for the system, whereby the unit LTA is now connected metallically to the line under test. The testman now performs the necessary measurement, e.g. insulation resistance-tip to ground-ring to ground-between tip and ring, and other standard test procedures.

The testman may now want to verify that the line under test can properly originate a call into the system (i.e. hear dial tone, proper detection of dialed digits, and the line. In order to do this, as shown in FIG. 2, he depresses a special pushbutton (not shown) on the panel MTP3 to operate a corresponding relay (not shown) to close its contacts LTA9 to transfer a voltage onto an identified lead LTA9 and onto an interrupt lead TRUNK INTERRUPT. The system upon recognizing the interrupt schedules the Test Trunk Interrupt Handler Program. The Test Trunk Interrupt Handler Program in turn calls the MCC I/O Handler Program which accesses the pushbutton adapted circuit (PBA) for transferring a data word D of the adapter circuit PBA into the memory of the data processor unit DPU. The data word D of the adapter circuit PBA contains the identity of the access trunk LTA or test trunk IRTT which is requesting the IN TEST. The Trunk Interrupt Handler Program on obtaining the identity of the trunk LTA or trunk IRTT from the adapter circuit PBA also obtains from memory the identity of the line to which the trunk LTA or trunk IRTT was connected to previously by the Call Processing Programs.

The Trunk Interrupt Handler program instructs the originating marker (OM) and the marker OM will then establish an orginating path, in the busy override mode, from the specific line circuit to an idle local register junctor RJ. The register junctor RJ returns Dial Tone which can be heard by the testman.

If necessary, the testman may now dial or TCMF digits (depending on the type of service this line is entitled to) just as if the subscriber himself would be using his telephone instrument.

The system can be equipped with as many as three local test desks each of which may have three trunk access circuits. Therefore, the system is arranged for nine trunk access circuits.

In addition, out and in testing may be provided from remote test desks. Such remote test desks represent themselves to the system via incoming remote test trunks IRTT. The call processing of access trunks LTA and test trunks IRTT's is identical.

Detailed Description of Access Trunk LTA

Figure 3:
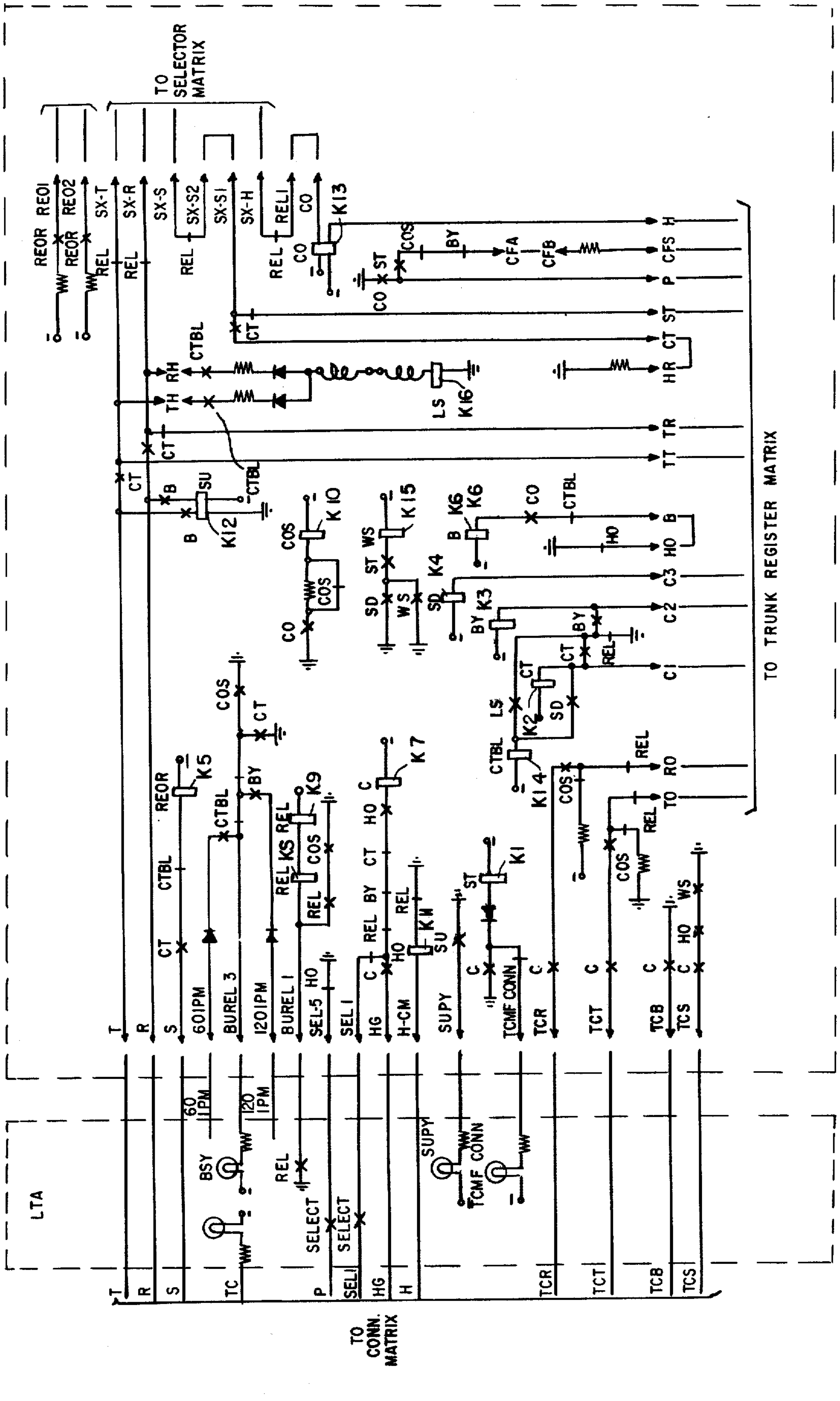
FIG. 3 is a schematic circuit diagram of a portion of the line testing arrangement in FIG. 1.
Figure 4:
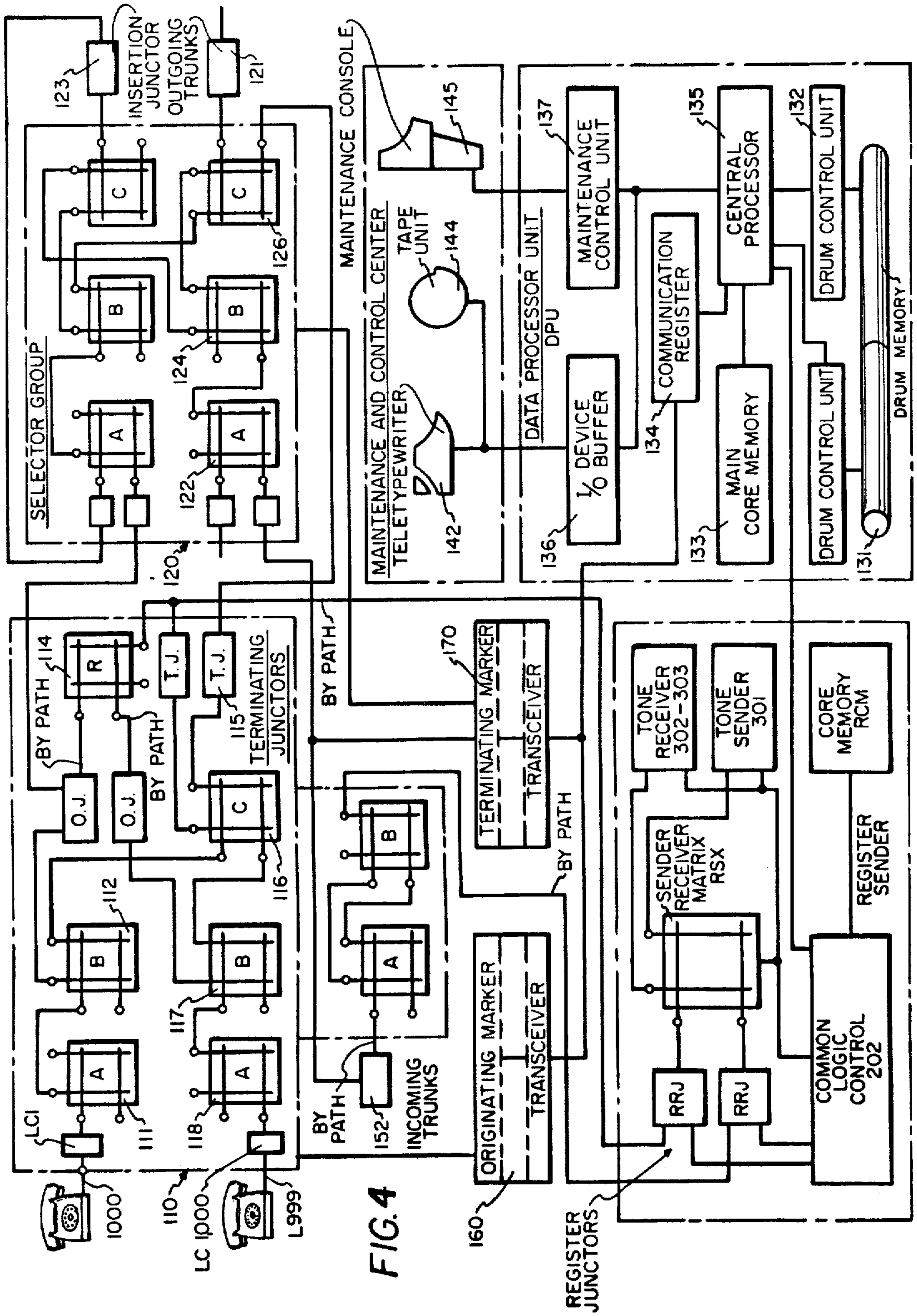
FIG. 4 is a block diagram of a communication switching system incorporating the preferred embodiment of the invention.

Referring now to FIG. 3, this circuit represents a line test access trunk LTA. It is used to originate and to perform manual tests on subscriber lines. As such, the circuit has some similarity with incoming trunks and is connected to an inlet of a trunk register matrix and an inlet of a selector matrix. It can be accessed from the manual test panel by manual pushbutton selection.

When the originating marker (OM) senses this call for service, an orginating path is established via the trunk register matrix and relay K13 operates via lead H. Relay K13 operates its slave relay K10. When the register is ready to receive signals, lead C3 will be grounded momentarily, as a wink start signal, causing relay K4 to operate briefly, which in turn causes the relay K15 to operate and go in hold before relay K4 releases again. A contact of relay K15 causes the TCMF input lamp to light at the panel MTP via lead TCS.

(Relays operated: K11, K7, K1, K13, K10, K15.)

The testman will now input digits, indentifying the line he wants to test. The digits are received by this circuit via leads TCT and TCR and are passed on to the register-sender RS via leads TO and RO. Afer all digits are received, the common control instructs the terminating marker TM to establish a connection from this circuit to the line to be tested.

The test call may encounter the following conditions:

Link Blockage;

Line Busy; or

Line Idle.

Circuit Features

| Feature | Component | Lead Name | Remarks |
|---|---|---|---|
| Start | K1 | — | K7 Slave |
| Cut Thru | K2 | C1 | |
| Busy | K3 | C2 | |
| Start Dial | K4 | C3 | |
| Reorigination (In-Test) | K5 | S | With K17.$\overline{K14}$ |
| Supervision Connect | K6 | B | With K13.$\overline{K14}$ |
| TCMF Connect | K7 | SEL 1 | With K11 Opp. & Pin 86 Gron. |
| Release | K8 | BUREL1 | |
| Release | K9 | BUREL1 | |
| Cut Off Slave | K10 | COR1 | |
| Connect Matrix Hold | K11 | H-CM | |
| Supervision | K12 | T, R, H | With K6 Operated |
| Cut Off | K13 | CO | |
| Cut-Thru To Busy Line | K14 | — | K16 Slave |
| Wink Start | K16 | — | With K1.(K4+K15) |
| Line Busy Sense | K16 | TH1, RH1 | With K14 Operated |
| Cut Thru Slave | K17 | C1 | K2 Slave |

Lamp Indications:

| Lamp | Indication |
|---|---|
| Steady Busy Lamp | — LTA Circuit Seized |
| 60 IPM Flashing Busy Lamp | — LTA Circuit Connected to a Busy Linek |
| 120 IPM Flashing Busy Lamp | — Link Blockage Encountered |
| Supy Lamp | — Indication of Presence of a Loop While the Testman Performs Other Functions. |
| TCMF Conn Lamp | — TCMF Keyset Connected |

Circuit Operation

When a test of a subscriber line has to be performed, the testman at the manual test panel (MIP) selects one of his test circuits (Prim or Aux) and establishes a path through the main test panel MTP connect matrix to this trunk LTA. This circuit supplies the MIP connect matrix with pull-ground via lead SEL-5.

As soon as the MTP connect matrix closes the path, relay K11 becomes energized via lead H-CM. A contact of KLL operates relay K7 since there is ground present on lead SEL1 for the duration of time the testman keeps the LTA select button depressed. Relay K7 immediately switches itself into a hold path via lead HG.

A contact of relay K7 operates relay K. A contact of relay K1 connects call for service voltage, lead CFSV, to the pull lead P of the trunk register matrix. (Relays operated: K11, K7, K1).

Link Blockage (Relays already operated: K11, Ky, K1, K13, K10, K15.)

The terminating marker TM would not find any idle links to the line to be tested and would notify the common control. The common control will instruct the register-sender RS which in turn will cause the momentary grounding of lead C2, operating relay K3. Relay K3 goes in hold.

A contact of relay K3 causes the release of relay K7. Relay K7 releases relay K1, relay K1 releases relay K5.

The trunk register matrix releases after this has been accomplished, causing the release of relays K13 and K10.

(Relays operated: K11, K3)

Release from this condition is accomplished when the testman pushes the non-locking release pushbutton of this LTA-Trunk, causing ground to appear on lead BUREL 1, operating the release relays K8 and K9 momentarily.

Contacts of relays K8 and K9 cause the release of relays K11 and K3. The circuit is now back in its idle condition.

Line Busy (Relays already operated: K11, K7, K1, K13, K15)

The terminating marker TM, in its busy-override mode, will establish a matrix path for this test call and will notify the common control.

The common control will instruct the register-sender RS to momentarily ground the C1 and C3 leads. Relays K2, K4 and K17 operate, causing K14 to operate, which connects relay K16 via TH and RH to the tip and ring leads. The presence of a potential (loop connected to a battery feed relay) on SX-T and SX-R operates relay K16 and a contact of relay K16 puts relay K14 in hold.

Relay K14 causes the busy lamp of the LTA circuit to flash at 60 IPM, indicating a connection to a busy line. Relay K2 also caused the release of relay K7. Relay K7 released relay K1. Relay K1 released relay K15.

The trunk register matrix releases after this has been accomplished and relay K4 releases as well.

(Relays operated: K11, K13, K10, K2, K14, K16).

The testman, at his discretion, can either wait with his tests until the line goes idle, or, if he suspects the busy condition to be associated with the reason for his test, cut-in on the line under test. He might even decide not to perform the test at this time and release from this condition by operating his LTA release button, causing all relays to release.

If he waits until the line goes idle, the loop across T and R will be opened and the operating and holding potential for relay K16 will disappear, causing relay K14 to release as well. All further operations will be as described for the Line Idle condition.

Line Idle (Relays already operated: K11, K7, K1, K13, K10, K15)

When the path is established, the hold coil of relay K13 becomes energized via lead CO.

The EAX common control instructs the register-sender to give a cut-thru signal, which is a momentary ground on lead C1, causing relays K2 and K7 to operate and hold. Relay K2 releases relay K7. Relay K7 releases relay K1. Relay K1 releases relay K15. The trunk register matrix releases after this has been accomplished.

(Relays operated: K11, K13, K10, K2, K17).

The testman's testing circuitry is now connected metallically through the T and R leads of this circuit and through the network to the tip and ring leads of the line to be tested. Tests can now be performed under complete manual control of the testman.

In case the testman has to keep-up the connection to a line, while he has to attend to some other testing function, he can just release his connect matrix from the MTP, causing relay K11 to release. The release of relay K11 causes relay K6 to operate, connecting supervisory relay K12 to tip and ring. Should an off-hook condition exist or occur, relay K12 would operate and light the Supy lamp at the MTP, alerting the testman.

When the testman reestablishes the connect matrix path, operating relay K11, relay K6 will release again and remove relay K12 from tip and ring.

Should an in-test be required, the testman would push the non-locking Reorig. pushbutton, causing relay K5 to operate momentarily, which will cause an interrupt to the computer via leads REO1 and REO2. After recognition of this interrupt, the common control would cause an orginating marker to connect this specific line to an idle originating junctor and an idle register junctor, from which dial tone would be heard.

(Relays still operated: K11, K13, K10, K2)

When all testing is completed, the testman pushes the non-locking LTA BSY/RLS button, causing relays K8 and K9 to operate momentarily. Contacts of relays K8 and K9 release all relays and restore the circuit to idle.

OUTTESTING AND INTESTING OF LINES

1. General Operation 1.1 Referring now to FIGS. 5–8, there is shown a series of flow charts for providing a description of the operation of the testing arrangement of the present invention with regard to the software characteristics and capabilities of the processor unit PPU when lines are being tested via the manuse test panels MTP or from a Remote Test Desk (not shown) which is similar in structure for the purposes of the present invention as the panel.

1.2 As mentioned previously there are two trunk types which are handled by Call Processing in a specialized manner so as to provide for manual testing of lines. These are the Line Test Access (LTA) and the Incoming Remote Test Trunk (IRTT). LTA's are located at the MTP whereas IRTT's handle remote test desks (wire signalling). LTA's and IRTT's appear as incoming trunk circuits on the trunk register matrix and selector matrix.

2.0 Outtesting 2.1 Origination 2.1.1 A test man can cause a Call for Service (CFSU) in the trunk register matrix by selecting the LTA, such as LTA9 (FIGS. 1 and 2) via one of his test circuits (Primary, Aux, etc.). This will also cause the TCMF sending facility (not shown) (Talk & Dial Pulse circuit also) to be connected to the LTA trunk circuit. The CFSV will be handled as any other trunk origination in EAX. The originating marker OM (not shown) will pull a path to an Incoming Register Junctor and control will be passed to Call Processing (CP) software (not shown) stored in the unit DPU. CP will perform a Class of Service translation for the orgination. Data included in an LTA's class of service is:

- Originating Class Type (OCT) = Wire Chief which allows for some special processing during this call.
- Equipment Type Number (ETN) A number (0–23) uniquely identifying the particular LTA or IRTT.
- Mode of Receive (MOR)=TCMF for LTA which causes CP to connect a TCMF Receiver.
- Start Dial Signal (SDS) = Wink Start (WS)
- Non-Local Pretranslation Required along with Incoming Digit Count (IDS)=1 allow CP to set up and interpret the digits the testman will input.

After retrieving this COS data CP will connect the receiver as specified and cause the WS SDS Recognition of the above events for an LTA at the MTP is via lamps. An RJ holding the trunk matrix path will light the Busy lamp of the appropriate LTA and a WS signal will cause the Input lamp to light on TCMF sending facility.

WS on an IRTT trunk will cause the removal of delay dial signal (reverse battery), and produce a visual indication at the remote test desk.

The register sender RS of FIG. 1 is also instructed to collect one digit. After the testman inputs a digit, CP will setup to distinguish between the two dialing patterns available to define a line in the EAX office. The two patterns are a seven digit Directory Number (DN) or a nine digit LNI (Office Section, subsection, Matrix, AB Group, A Unit, A Unit Inlet) of the line to be tested.

2.2 Digit Analysis 2.2.1 The RS is set up by CP to Fast Interdigital timing between digits 7 and 8 and to collect a Total of nine digits. After timing out (testman has inputted a DN) or collecting nine digits (testman has inputted an LNI), CP determines which pattern was inputted by the number of digits input. In the DN case, analysis continues as any other normal call. If the seven digits input are not a valid termination to a line within the office appropriate action is taken (See 2.2.2). If an LNI was input, control is passed by CP to a maintenance program (LNTERM) shown in FIGS. 7 and 8 and stored in the unit DPU which will translate the inputted LNI in digit form to its internal form and check that the inputted digits specify a valid termination in the office. The program LNTERM is in the form of a module designated V73. (See 2.2.2 for action taken when digits string is invalid). If the digit string is valid, LNTERM will retrieve a Terminating Group Number (TGN, used by CP to determine selector matrix outlets which can be used to access the specified line) and pass control back to CP as if it had performed a DN translation (the DN pattern would have taken that route). CP will now terminate this call.

2.2.2 Whenever CP cannot terminate an IRTT/LTA call, trunk reorder tone is given to the originating trunk. In the case of the LTA this will cause the BSY lamp (FIG. 3) to flash at 120IPM. In cases where the testman has inputted an invalid digit string. (i.e. an LNI with Office=2 when it doesn't exist, or three digit office code (DN) is not a line termination in this office, etc.) CP will pass control to a maintenance program (V99). If an LTA, V99 will light Test Indicator Lamp B4. For both the LTA and IRTT, program module C32 will be called to give universal lockout to the Incoming RJ (causes trunk reorder tone to be given by IRTT/LTA trunk circuit). Hence the B4 test Indicator lamp indicates an error input when the testman is using an LTA. As a result of trunk reorder tone the LTA busy lamp flashes at 1201PM and the TCMF sending facility will disconnect TCMF Connect Lamp, Input Lamp, etc. will reflect this).

Messages output by computer CP for error conditions are not inhibited. Hence hardware/software errors (i.e. Drum Translation problems) will be output if they occur. One message unique to handling an LTA-/IRTT which may appear is CP IN 14, VRA, 4. This message would appear if no coincidence occurs when LNTERM (LNI digit pattern) was searching maintenance table VRA for a TGN value. Core table KDB implied a given Line Matrix is equipped but there is no corresponding entry in Drum Table VRA. This is a data base error.

2.3 Termination 2.3.1 Sincè an LTA/IRTT is designated Wire Chief some special processing occurs during the terminating phase computer by CP. Alternate routing annoyance call termination action, and PBX scan considerations are ignored. Busy line override and metallic cut-through are provided by requesting the marker TM to operate in Wire Chief Mode. An additional feature of Wire Chief is additional TM checks are made on the line circuit to which it is terminating.

Essentially, only the line which is given (LNI pattern) or the LNI received via the DN translation will be used for termination. The LNI pattern allows for termination to PBX lines which may only have a single DN.

2.3.2 Path blockage after retry will result in trunk reorder tone. If a termination is made to a line and a fault is detected, a CP message will be printed on the TTY (true, also, for normal calls). Terminations to busy lines will result in CP giving a cut-thru type of 5 (C1 and C3 leads) to the LTA/IRTT trunk. (Non busy, only C1 is given). The LTA has circuiting which when enabled by C1 and C3 leads will sense the busy/idle condition of the line to which it is terminated. If loop is present (busy) the Busy lamp will flash at 60IPM, otherwise lamp will be steady if loop is removed, lamp will be steady and even if loop is restored lamp will remain steady. If only C1 lead is given the Busy lamp will be steady, even if a loop later appears across the line. As in the case of trunk reorder tone being given the TCMF Sending Facility will be dropped.

2.3.3 Whenever CP terminates an LTA/IRTT to a line, an entry is made in a core table HTI. Two words are reserved for each ETN value between 0–23. The two words contain the Call Status Terminating (CST) and the LNI to which the particular LTA/IRTT is terminated and are used for Intesting. Once a path is established to a line, the testman can perform a variety of tests.

A quick reference to test facilities and procedures for lines from the MTP is given in the following Tables. Once connected to a line the testman can also perform an Intest.

3.0 Intesting 3.1 An intest operation will now be described from a point of view of the software operation of the data processor unit DPU with reference to the flow chart diagrams for program module V17 (INTEST) of FIGS. 5 and 6 of the drawings. The intest of a line is basically a check on the ability of a line to originate and be serviced by Call Processing without having to hardware connect to the subscribers tip and ring leads. Since the connection to a line made via an outtest is on the network side of the line circuit, a true origination (operation of the line relay carrying CFSV potential) is impossible. Hence an originating path for the line is made via a test call to an Originating Marker. The ability to pull that path is checked and the Class of Service of that line may be checked.

3.2 An intest is accomplished by the testman from an LTA by first establishing a path (outtest) and then by locking the Loop Pushbutton (Primary Circuit) and depressing the Reoriginate Pushbutton. The Loop Button connects the TCMF facility (not shown) to the Tip and Ring leads of the Primary circuit which is metallically connected (via the LTA trunk and EAX network) to the Tip and Ring of the line under test. This provides loop to hold a path (once established), sending capabilities (dial pulse or TCMF) and enables the Reorigination Pushbutton. Depressing the Reorigination Pushbutton causes an interrupt in the EAX system which causes the scheduling of a maintenance program INTEST. Also a bit is set in Push Button Adaptor word D which the interrupt handler moves to a core location HITRTT. Each of the 23 bits of this word represent an intest request (set) for the LTA/IRTT corresponding to each bit location.

INTEST will determine when scheduled, which LTA-/IRTT is requesting an intest and will retrieve the terminating information left in HTI by CP. INTEST will only perform the function of establishing an originating path if conditions of the previous termination are satisfactory. To prevent unnecessary malfunctions of the OM, reoriginations from line whose termination phase indicated a line circuit fault are disallowed. An LTA termination to a busy line will be prohibited from reoriginating (IRTT circuits prevent the same by a hardware lockout of the reorigination interrupt).

3.3 There is no means of signalling the testman via the circuit that an intest request has been denied other than a dead headset. This is because control of the originating LTA/IRTT trunk was released when termination cut-thru was given by the Incoming RJ and no new path to a Local RJ will be pulled.

The presence of a line circuit fault could preclude a successful origination from this line, hence the result is nearly equivalent to Tip and Ring hardwire connection (TM checks in Wire Chief mode include operation of Line relay producing CFSU potential). Note: An unequipped line will always produce a line circuit fault since TM AC continuity check made normally through a ringer will fail causing a line circuit fault status.

An LTA intest request denial, however, will be reflected in the Test Indicator lamps at the MTP. Lamp A1-A3 will indicate which LTA (1-3) A4 will be off and lamps B1-B4 will be the four bit CST field stored in table HTI. A CST=$\phi$ would indicate a Clear and Start has occurred since termination.

3.3.1 If the CST value for the termination allows an intest the INTEST will request the Originating Marker to establish an originating path between the lines and a Local RJ. Test call C (override busy) is utilized using a partial communication frame (OM selects OJ and RJ). If the OM produces a CCR Ready Interrupt having selected a path control is passed to Call Processing as if a true origination was made by the subscriber and the testman will receive what ever the subscriber COS dictates (i.e. Dial Tone, Non-Dial Line, etc.). The testman may dial or key in TCMF (if reflected in subscribers COS) as the subscriber if he receives a start dial signal (most likely dial tone).

The most essential point here, is that, if the Marker proceeds to handle the origination beyond sequence state 113 the testman will receive the identical response the subscriber would. Hence if the OM malfunctions prior to RJ hold, he will have a dead headset; but unlike the subscriber he will not generate anouther CFSV unless he again utilizes the Reorigination Button. If an RJ is holding the path, then Reorder Tone is possible if problems occur before or during digit collection. Reorder Tone in this case is an audible 120IPM. No knowledge is retained to indicate to CP that this call is a testman origination, hence ticketing, metering, etc. are all valid and discretion is warranted. Reorigination from a line with either no COS or a COS marked invalid would produce a CP TTY message and Reorder Tone to the line.

3.3.2 In the event the Marker cannot select a path or Malfunction before sequence state 113, Intest will be given control so as to attempt a retry. Three retrys (easily changed) are attempted for an IRTT. If all are unsuccessful the testman will be left with a dead head set, although he may try again by making another intest request. No retrys are attempted for an LTA (again easily changed). The MTP test indicator lamps are used to indicate the nature of the problem when attempting to pull an origination path. Lamps A1-A3 indicate which LTA is being serviced (1-3, respectively). A4 will be lit to indicate B1-B4 lamps are the Call Status Originating (CSO) data. A CSO of zero indicates a malfunction or other problem occurred before sequence state 113. Again the testman may request another intest after retrys have expired.

3.4 Multiple reoriginations by the same LTA/IRTT are allowed without retermination. It is necessary to drop the previous intest path before a new intest. The IRTT-Test Desk circuits prevent an intest request until the loop holding the previous intest path has been opened (dropping that path). The LTA circuit is neither hardware or software interlocked. Hence, the testman must manual release his Loop Pushbutton so as to drop the previous intest path. Multiple paths will be established if he does not do this.

APPENDIX A

Lamp Indicators at MTP for LTA Originated Tests

LTA Lamps

TCMF Conn — Indicates that the TCMF Sending Facility is connected to Tip and Ring of the Line Test Across Trunk. Will extinguish after cut-thru.

SUPY — Indicates loop when there is no test circuit attached to Tip and Ring and a path is being held by the LTA.

SELECT — Indicates a test circuit is attached to the LTA. Flashes at 120 IPM when select push button of test circuit to which LTA is connected is depressed.

BUSY/RELEASE — Steady indicates path to an RJ or non-busy line is being held. 60 IPM indicates path to a busy line is being held. 120 IPM indicates trunk reorder tone was given to the LTA trunk. (Refer to Test Indicator lamps usage.)

TCMF Sending Facility

TCMF SEIZED — Indicates one of the test trunk accesses (LTA, TTA, CL) is connected to the TCMF Sending Facility. Will extinguish after cut-thru.

INPUT — Indicates test trunk access has received a Start Dial Signal from RJ and digit input can proceed. Will extinguish after cut-thru.

Test Indicator Lamps (when using LTA)

Out testing

B4 — only lamp lit — Indicates digit string input by testman during Out test was invalid (did not define a line termination in office)

Intesting

A1-A3 Indicates which LTA's request for an Intest has been denied or has problems originating.

A4 — Indicates whether data in B1-B4 lamps is CST (B4 off) or CSO (B4 lit). CST data is from previous termination (Out test). CSO data is result of problems encountered when trying to pull originating path.

| B1-B4 | B1B2B3B4 | |
|---|---|---|
| CST | 0 0 0 0 | Clear and Start since termination |
| | 1 0 0 1 | Line found busy during termination |
| | 1 1 0 0 | Line circuit fault found during termination |
| | 1 0 1 0 | Line found busy and line circuit fault during termination |
| CSO | 0 0 0 0 | OM malfunction before SS113, Both OM's MOS, CCR problems, etc. |
| | 0 0 1 0 | All AB links busy |
| | 0 0 1 1 | All RJ's busy |
| | 0 1 0 0 | Path Busy |

| | TEST | CKT | METER SCALE | BUTTONS PUSHED |
|---|---|---|---|---|
| 1. | TEST FOR VOLTAGE OF TEST BATT | P | 0–150V | 150V;VMT |
| | | | 0–15V | 15V:VMT |
| 2. | LOOP OR LINE BRIDGE TEST WITH | P | 0–750V | NONE |
| | NO BATT. (TESTING 2 WIRE | | 0–150V | OHM INTER, OHM HI |
| | LINES FOR VOLTAGE FROM LINE EQUIP OR OTHERWISE BETWEEN WIRES) | | 0–15V | OHM LOW, OHM HI |
| 3. | TEST FOR NEGATIVE POTENTIAL | P | 0–750V | GRD |
| | ON RING SIDE OF LINE | | 0–150V | GRD; OHM INTER |
| | | | 0–15V | GRD; OHM LOW |
| 4. | TEST FOR NEGATIVE POTENTIAL | P | 0–750V | GRD; REV |
| | ON TIP SIDE OF LINE | | 0–150V | GRD; REV, OHM INTER |
| | | | 0–15V | GRD; REV, OHM LOW |
| 5. | LOOP TEST WITH BATT | P | 0–150V | 150V |
| | (MEASURING INSULATION RESISTANCE READ IN VOLTS BETWEEN WIRES OF A2 WIRE LINE, INSULATED TEST BATT USED. VOLTS THEN CONVERTED TO OHMS | | 0–15V | 15V |
| 6. | RESISTANCE TO A GRD ON RING SIDE OF LINE (READ IN VOLTS AND CONVERTED TO OHMS) | P | 0–150V | 150V, GRD |
| 7. | RESISTANCE TO A GRD ON TIP SIDE OF LINE (READ IN VOLTS AND CONVERTED TO OHMS) | P | 0–150V | 150V, REV, GRD |
| 8. | CAPACITANCE TEST | | | |
| | A. INDICATION OF CAPACITANCE BETWEEN WIRES OF A TWO WIRE LINE | P | 0–150V | 150V, CT |
| | B. INDICATION OF CAPACITANCE BETWEEN RING SIDE OF LINE AND GROUND | | | 150V, CT, GRD |
| | C. INDICATION OF CAPACITANCE BETWEEN TIP SIDE OF LINE AND GROUND | | | 150V, CT, GRD, REV |
| 9. | TEST FOR POSITIVE POTENTIAL | P | 0–750V | GRD, FEMF |
| | ON RING SIDE OF LINE | | 0–150V | GRD, FEMF, OHM INT |
| | | | 0–15V | GRD, FEMF, OHM LOW |
| 10. | TEST FOR POSITIVE POT ON TIP | P | 0–750V | GRD, FEMF, REV |
| | SIDE OF LINE | | 0–150V | GRD, FEMF, REV, OHM INTER |
| | | | 0–15V | GRD, FEMF, REV, OHM LOW |
| 11. | LOOP RESISTANCE | P | MID SCALE | |
| | | | 50,000 OHMS | OHM HI |
| | | | 5,000 OHMS | OHM HI, OHM INTER |
| | | | 500 OHMS | OHM HI, OHM LOW |
| 12. | RESISTANCE TO A GRD ON RING | P | MID SCALE | |
| | | | 50,000 OHMS | OHM HI, GRD |
| | | | 5,000 OHMS | OHM HI, OHM INTER GRD |
| | | | 500 OHMS | OHM HI, OHM LOW, GRD |
| 13. | RESISTANCE TO A GRD ON TIP | P | MID SCALE | |
| | | | 50,000 OHMS | OHM HI, GRD, REV |
| | | | 5,000 OHMS | OHM HI, GRD, REV, OHM INTER |
| | | | 500 OHMS | OHM HI, GRD, REV, OHM LOW |

| | TEST | CKT | METER SCALE | BUTTONS PUSHED |
|---|---|---|---|---|
| 14. | RINGING | P,A | | |
| | A. METALLIC ON INDIVIDUAL LINE | | | A. RING |
| | B. RING CONDUCTOR TO GRD ON 4 PTY LINE FREQ 1<br>do. 2 | | | B. RING, 1<br>RING, 2 |
| | C. TIP CONDUCTOR TO GRD ON 4 PTY LINE FREQ 1<br>do. 2 | | | C. RING, RING REV, 1<br>RING, RING REV, 2 |
| 15A. | TRANSMISSION TEST (TALKING CHECK THRU ARTIFICIAL LINE TO SUBSCRIBERS TELEPHONE. ADJUST RHEOSTAT FOR 40MA READING) | P | 0–750MA<br>0–150MA | T BAT, TMT, RH<br>T BAT, TMT, RH, 150MA |
| 15B. | TRANSMISSION TEST WITH PORT- ABLE TEST SET. (CONNECT PORTABLE TEST SET TO N+T JACK ON MTPF JACK PANEL). | P | | N+T TEST |
| 16. | WHEATSTONE BRIDGE WITH PORTABLE TEST SET (CONNECT PORTABLE TEST SET TO WB JACK ON MTPF JACK PANEL) | P | | WB |
| 17A. | INSULATION BREAKDOWN (BETWEEN TIP AND GRD) WHEN 200 VOLTS D-C IS APPLIED TO TIP | P | 0–750MA | (IBT) |
| 17B. | INSULATION BREAKDOWN (BETWEEN WIRES OR BETWEEN RING AND GRD) WHEN 200 VOLTS D-C IS APPLIED TO RING. | P | 0–750MA | IBT, REV |
| 18A. | COIN COLLECT (PRE PAY) | P | | |
| | A. COLLECT COINS BY CONNECT- ING +140V TO TIP | | A. 0–750 MA | CC |
| | B. FURNISH VARIABLE CURRENT FOR ADJUSTMENT OF COIN BOX RELAY | | B. 0–750MA<br>0–150MA | CC, RH<br>CC, RH, 150MA |
| 18B. | COIN RELAY (PRE PAY) | P | | |
| | A. RETURN COINS BY CONNECT- ING −140V TO TIP | | A. 0–750MA | CR |
| | B. FURNISH VARIABLE CURRENT FOR ADJUSTMENT OF COIN BOX RELAY. | | B. 0–750MA<br>0–150MA | CR, RH<br>CR, RH, 150MA |
| 18C. | TESTING COIN POLARIZED RELAYS (POST PAY) | P | | |
| | A. EXTENDING BATT ON RING, AND GRD ON TIP (NORMAL POLARITY) TO COIN BOX RELAY | | A. 0–750MA<br>0–150MA | TMT, T BAT, RH<br>TMT, T BAT, RH, 150MA |
| | B. REVERSING POLARITY TO CHECK FOR OPERATION OF COIN BOX RELAY | | B. 0–750MA<br>0–150MA | TMT, T BAT, RH,REV<br>TMT, T BAT, RH, REV, 150MA |
| 19. | DIAL TEST | A | | |
| | A. CORRECTING FULL SCALE METER READING FOR VARIATIONS IN EXCHANGE BATT. | | 0–15PPS<br>0–100% MAKE | SET FULL SCALE (ADJUST RHEOSTAT) SET FULL SCALE |
| | B. READYING CKT FOR DIAL SPEED AND PERCENT MAKE TESTS | | | DIAL TEST |
| | C. SPEED TEST | | 0–15PPS | DIAL TEST |
| | D. PERCENT MAKE TEST | | 0–100% MAKE | DIAL TEST, PERCENT MAKE OR PULSE TEST |
| 20. | SOUNDER AND TON ESTS | | | |
| | A. SHORTED LINE OR GRD ON THE RING WILL OPERATE THE SOUNDER AND LIGHT THE SUPY LAMP. | A<br>S | | A. AUX. S<br>A. SOUNDER . NO KEY |
| | B. SHORTED LINE OR GRD ON RING WILL NOT OPERATE THE SOUNDER AND LIGHT THE SUPY LAMP. | A<br>S | | B. AUX S, S SW<br>B. SOUNDER . S SW |
| | C. SHORTED LINE OR GRD ON TIP WILL OPERATE THE SOUNDER AND LIGHT THE SUPY LAMP. | A<br>S | | C. AUX S, S REV<br>C. SOUNDER S REV |
| | D. SHORTED LINE OR GRD ON THE TIP WILL NOT OPERATE THE SOUNDER, AND THE SUPY LAMP WILL BE DARK | A<br>S | | D. AUX S. S SW, S REV<br>D. SOUNDER S SW, S REV |
| 21. | RECEIVER OFF HOOK TONE | A | | ROH |

1. NAME

Figure 5:
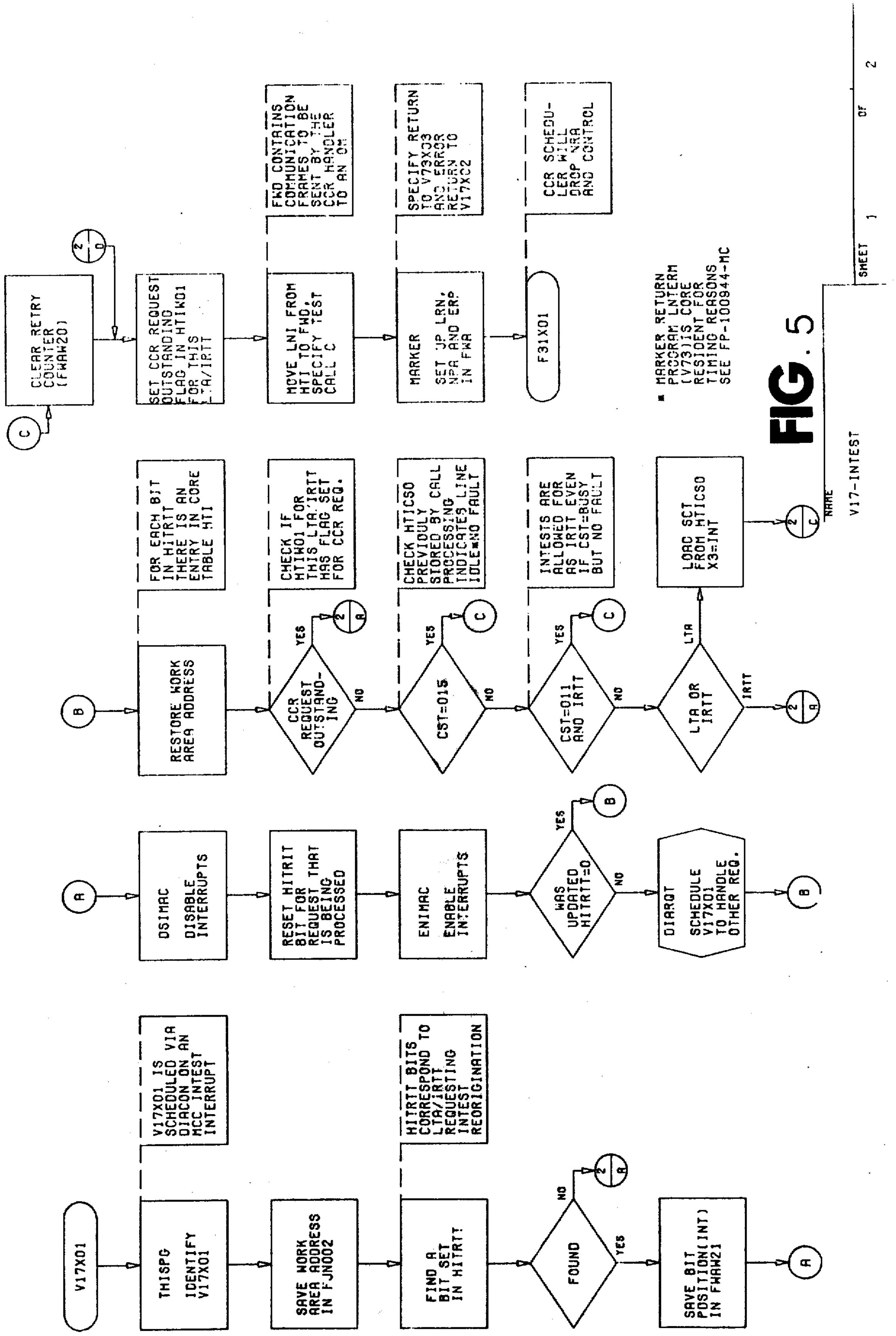
FIGS. 5–8 are program flow charts illustrating one technique for controlling the automatic test system to perform the method of the present invention.
Figure 6:
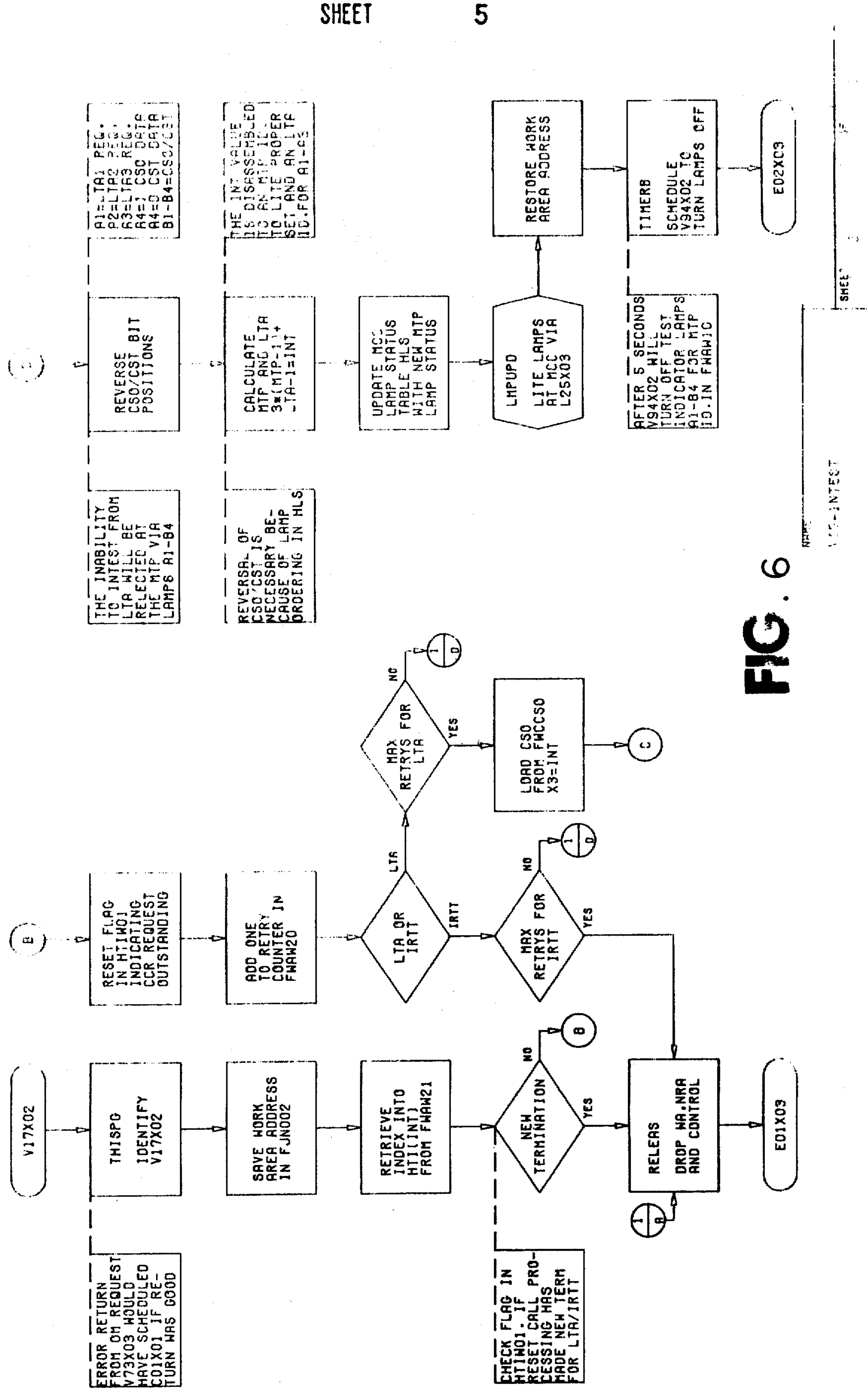

V17 — LTA/IRTT Intest Request Processor INTEST is the name of the in-testing program shown in FIGS. 5 and 6 of the drawings.

2. PURPOSE

The module V17 will now be described. It provides origination capability to a line under test by a testman as the Manual Test Panel (MTP) or at some remote test desk. The testman's access to the EAX-1 system, when using the MTP, is via a Line Test Access (LTA) trunk circuit. The testman's access to the EAX-1 system, when using a test desk, is via an incoming Remote Test Trunk (IRTT) circuit.

3. FUNCTIONS a. Recognizes and identifies the particular LTA-/IRTT requesting service so as to obtain the identity of the line under test.

b. Causes an Originating Marker to pull a path from the line inlet under test to an RJ.

c. Passes control to Call Processing (if path pull is successful) as if the origination was a genuine Call for Service by the line's subscriber.

d. If path pull cannot be completed, INTEST informs the testman. An unsuccessful intest by testman from IRTT will result in a dead headset. An unsuccessful intest by testman from an LTA will result in indicator lamps being turned on at the MTP.

4. INPUTS 4.1 SOFTWARE 4.1.1 Work Area Overlay 4.1.1.1 FWA is used to preserve data so as to provide continuity in the event of an unsuccessful path pull attempt by an OM leading to re-entry into INTEST.

4.1.1.2 OM marker response communication frames are contained in overlay FWC.

4.1.2 Core Tables 4.1.2.1 Table HIT is accessed to determine which LTA-/IRTT(s) is (are) requesting an intest.

4.1.2.2 Table HTI is processed to obtain the line number identity and other information of the line under test by the respective LTA/IRTT.

4.2 HARDWARE

None.

5. OUTPUTS 5.1 SOFTWARE 5.1.1 Work Area Overlays

Output from INTEST is stored in work area overlays FWA and FWD.

5.1.1.1 When attempting to pull a path via the Computer Communication Register (CCR) Handler program, INTEST will pass OM communication frames in FWD and other control information in FWA.

5.1.1.2 After lighting Manual Test Panel (MTP) indicator lamps, INTEST will leave the MTP identity in FWA for use by INDRUM, which will extinguish those lamps after a time delay.

5.1.2.3 A flag in table HTI will be set to indicate a request is currently being processed on that LTA/IRTT.

5.2 HARDWARE

INTEST indirectly accesses the communication register and the maintenance display adapter via operating system programs and subroutines.

6. CONTROL 6.1 ENTRY POINTS

Two entry points are used in INTEST.

6.1.1 V17X01 — INTEST request entry point.

This entry line is scheduled by the INTEST interrupt Handler or by INTEST, itself, via DIACON. The interrupt Handler will only schedule when table HIT contains no prior intest requests.

6.1.2 V17X02 — Path pull failure entry point

This entry line is scheduled by core module LNTERM if the OM test call sent by INTEST was not successful.

6.2 EXIT POINT 6.2.1 E02X03 — TIMER B

This program is branched to directly in order to schedule V94X02 after a 5-second delay. V94X02 will extinguish the MTP indicator lamps that were illuminated by INTEST.

6.2.2 E01X01 — RELEASE

Branch to this operating system entry point occurs when INTEST finds that no requests are outstanding or that a new request is pending for an LTA/IRTT which it is currently processing. Also, exit to E01X01 occurs when retries are expired when handling an IRTT request.

6.2.3 F31X01 — CCR Scheduler

Branch to the executive program occurs in order to send an OM test call, which will pull an originating path from the line under test.

7. SUBROUTINES USED 7.1 L20X01 — DIARQT

If INTEST finds that there is more than one request, INTEST makes a DIACON request to schedule itself to handle the other requests.

7.2 L25X03 — Lampllghter

INTEST branches to this subroutine in order to update all lamps at the MCC. Prior to this request, INTEST will have updated lamp status table HLS so as to effect lighting of MTP indicator lamps.

8. NARRATIVE 8.1 DISCUSSION

Figure 7:
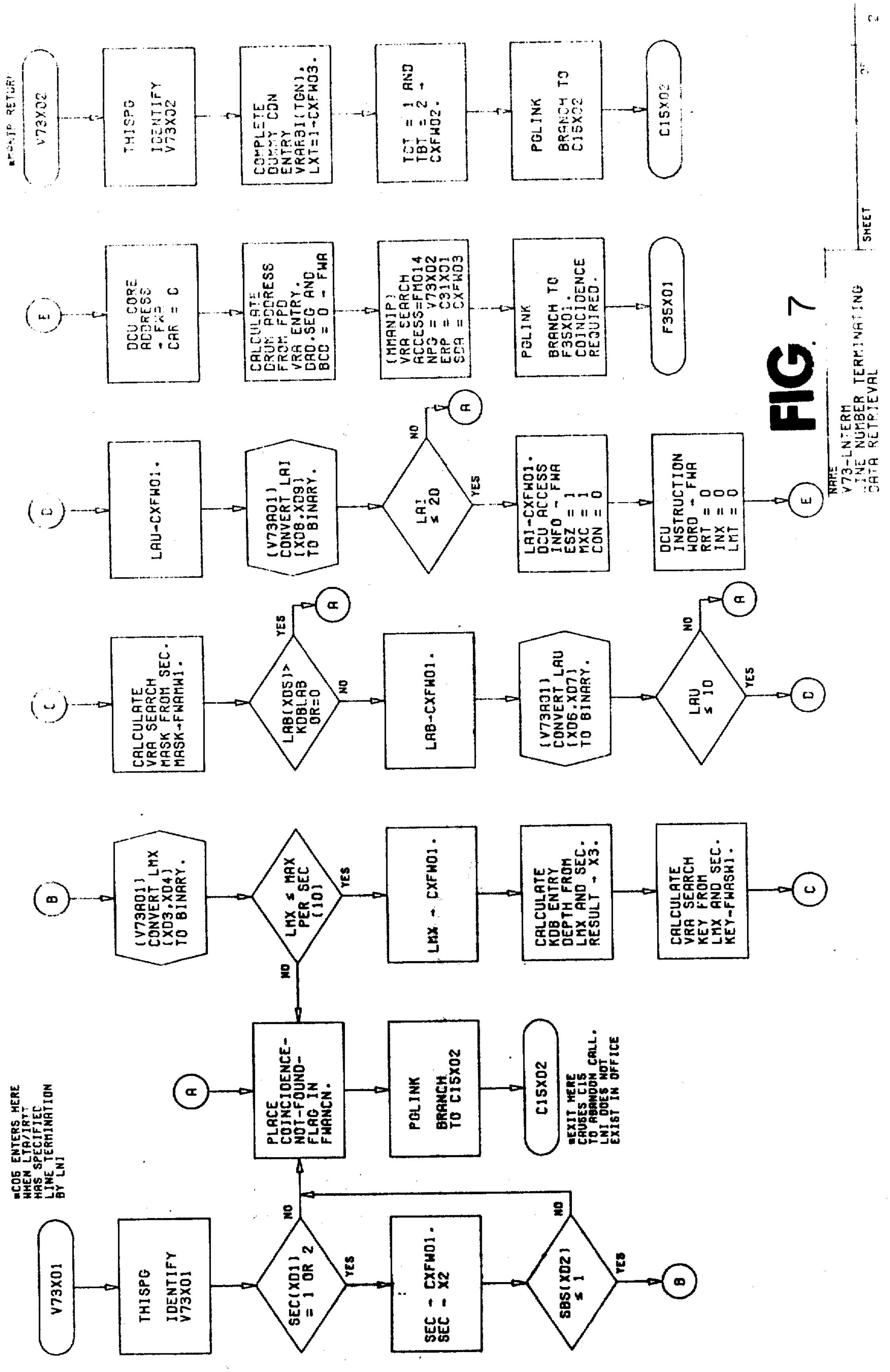
Figure 8:
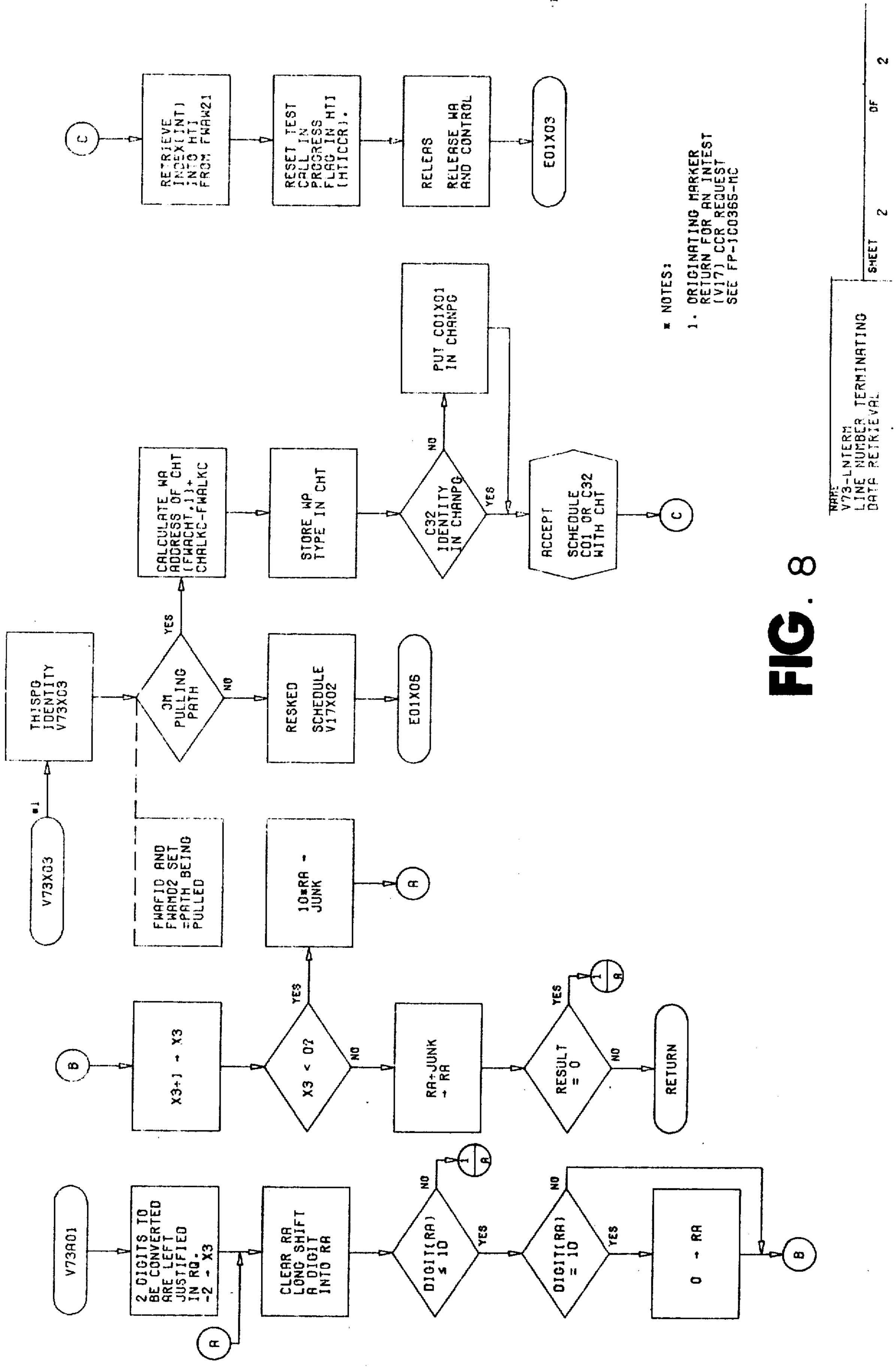

INTEST, in conjunction with Call Processing and module V73 of FIGS. 7 and 8, LNTERM, provides the necessary support for the manual testing of lines via the Line Test Access (LTA) circuit at the MTP. INTEST provides the testman the ability to originate from a subscriber's line and be serviced by Call Processing as if he were the subscriber. An Intest is accomplished by the testman from an LTA/IRTT by first establishing a path (outtest) to the subscriber's line.

8.1.1 INTESTING

The intest of a line is basically a check on the ability of a line to originate and be serviced by Call Processing without having to hardwire connect to the subscriber's tip and ring leads. Since the connection to a line made via an outtest is on the network side of the line circuit, a true origination (operation of the line relay causing CFSV potential) is impossible. Hence, an originating path for the line is made via a test call to an Originating Marker. The ability to pull a path is checked and the Class of Service of that line may be checked.

An intest is accomplished by the testman from an LTA by first establishing a path (outtest) and then by locking the Loop Pushbutton (Primary Circuit) and depressing the Reoriginate Pushbutton. The Loop Button connects the TCMF facility to the tip and ring leads of the Primary circuit, which is metallically connected (via the LTA trunk and EAX network) to the tip and ring of the line under test. This provides loop to hold a path (once established), provides sending capabilities (dial pulse or TCMF) and enables the Reorigination Pushbutton. Depressing the Reorigination Pushbutton causes an interrupt in the EAX system, and the scheduling of the maintenance program, INTEST. Also, a bit is set in Pushbutton Adapter Word D, which the Interrupt Handler moves to core location HITRTT. Each of the 23 bits of this word represents an intest request (set) for the LTA/IRTT corresponding to each bit location.

INTEST will determine, when scheduled, which LTA/IRTT is requesting an intest and will retrieve the terminating information left in HTI by CP. INTEST will only perform the function of establishing an originating path if conditions of the previous termination are satisfactory. To prevent unnecessary malfunctions of the OM, reoriginations from a line whose termination phase indicated a line circuit fault are disallowed. An LTA termination to a busy line will be prohibited from reoriginating (IRTT circuits prevent the same by a hardware lockout of the reorigination interrupt).

There is no means, other than a dead headset, of signalling the testman, via the circuit, that an intest request had been denied. This happens because control of the originating LTA/IRTT trunk is released when termination cut-thru is given by the Incoming RJ and no new path to a local RJ is pulled.

The presence of a line circuit fault can preclude a successful origination from this line; hence, the result is nearly equivalent to a tip and ring hardwire connection (TM checks in Wire Chief mode include operation of line relay producing CFSV potential).

NOTE: An unequipped line will always produce a line circuit fault since TM AC continuity check, made normally through a ringer, will fail, causing a line circuit fault status.

An LTA intest request denial, however, will be reflected in the Test Indicator Lamps at the MTP. Lamps A1-A3 will indicate which LTA (1–3), A4 will be extinguished and lamps B1-B4 will be the 4-bit CST field stored in table hTI. A CST=0 will indicate a Clear and Start has occurred since termination.

If the Call Status Terminating (CST) value for the termination allows an intest, INTEST will request the Originating Marker to establish an originating path between the line and a Local RJ. Test Call C (override busy) is utilized, using a partial communication frame (OM selects OJ and RJ). If the OM produces a CCR Ready Interrupt after having selected a path, control is passed to Call Processing as if a true origination was made by the subscriber and the testman will receive whatever the subscriber's COS indicates (i.e., Dial Tone, Non-Dial Line, etc.). The testman may dial or key in TCMF (if reflected in subscriber's COS) as the subscriber if he receives a start dial signal (most likely, dial tone).

The most essential point is that if the Marker proceeds to handle the origination beyond sequence state 113, the testman will receive the identical response the subscriber would. Hence, if the OM malfunctions prior to RJ hold, he will have a dead headset; but, unlike the subscriber, he will not generate another CFSV unless he again utilizes the Reorigination Button. If an RJ is holding the path, then Reorder Tone is possible, if problems occur before or during digit collection. Reorder Tone, in this case, is an audible 120 IPM. No knowledge is retained to indicate to CP that this call is a testman origination; hence, ticketing, metering, etc., are all valid and discretion is warranted. Reorgination from a line with either no COS or a COS marked invalid would produce a CP TTY message and Reorder Tone to the line.

In the event the Marker cannot select a path or malfunctions before sequence state 113, INTEST will be given control in order to attempt a retry. Three retries (easily changed) are attempted for an IRTT. If all are unsuccessful, the testman will be left with a dead headset, although he may try again by making another intest request. No retries are attempted for an LTA (again, easily changed).

The MTP Test Indicator lamps, located on the Maintenance Manual Test Board (MTB), are used to indicate the nature of the problem when attempting to pull an origination path. Lamps A1-A3 indicate which LTA is being serviced (1–3, respectively). A4 will be lighted to indicate that B1-B4 lamps are the Call Status Originating (CSO) data. A CSO of zero indicates that a malfunction or other problem occurred before sequence s state 113. Again, the testman may request another intest after retries have expired.

Multiple reoriginations by the same LTA/IRTT are allowed without retermination. It is necessary to drop the previous intest path before a new intest. The IRTT-Test Desk circuits prevent an intest request until the loop holding the previous intest path has been opened (dropping that path). The LTA circuit is neither hardware nor software interlocked. Hence, the testman must manually release his Loop Pushbutton to drop the previous intest path. Multiple paths will be established if he does not do this.

8.1.2 INTEST MTP Lamp Indications

Lamps A1-A3 indicate which LTA's request for an intest has been denied or has problems originating.

Lamp A4 indicates whether data in B1-B4 lamps is CST (B4 extinguished) or CSO (B4 illuminated). CST data is from previous termination (outtest). CSO data results from problems encountered when trying to pull originating path.

| Lamps | B1 | B2 | B3 | B4 | |
|---|---|---|---|---|---|
| CST | 0 | 0 | 0 | 0 | Clear and Start since termination. |
| | 1 | 0 | 0 | 1 | Line found busy during termination. |
| | 1 | 1 | 0 | 0 | Line circuit fault found during termination. |
| | 1 | 0 | 1 | 0 | Line found busy and line circuit fault during termination. |
| CSO | 0 | 0 | 0 | 0 | OM malfunction before SS113, both OM's MOS, CCR problems, etc. |
| | 0 | 0 | 1 | 0 | All AB links busy. |
| | 0 | 0 | 1 | 1 | All RJ's busy. |
| | 0 | 1 | 0 | 0 | Path Busy. |

8.2 TECHNIQUE

INTEST is scheduled via DIACON with a work area of 26 words. INTEST, when entered, retrieves intest request word, HITRTT. This word is interrogated and the highest-order set bit is the request that will be satis- ·· d by this entry into INTEST. This bit is reset and the word restored in HITRTT. If the word is zero upon entry, INTEST will release its word area and CP control. If HITRTT is non-zero after resetting the bit for the request INTEST is about to process, INTEST will schedule itself, via DIACON, to handle the additional request(s).

For each bit position there is a corresponding 2-word entry in core Table HTI. The data in the entry consist of the Call Status Terminating (CST) and LNI information associated with the line to which the requesting LTA/IRTT is terminated (prior outtest call). These data would have been stored by Call Processing software as a result of that termination.

INTEST will interrogate this entry and determine if a request is currently being processed with respect to this entry. This condition is indicated by a CCR processing flag in the entry. INTEST will then determine if the CST value will allow a reorigination from the line. Acceptable CST values are:

1101 - Line idle - no line circuit fault (LTA/IRTT)
1001 - Line busy - no circuit fault (IRTT)

LTA/IRTT's are distinguished by bit positions. Request bit positions 0–8 are used by LTA's and bit positions 9–23 are used by IRTT's. See FIG. 1 for assignments.

If the CST is unacceptable, INTEST will not perform the reorigination. If the request is from an LTA, core table HLS (MCC lamp status) will be updated as described in Section 8.1.2. Lamplighter will be called to update the Maintenance Display Adapter buffer to the updated status, thus illuminating the appropriate MTP task indicator lamps. INTEST will then schedule, via the timer queue, INDRUM to extinguish the MTP indicator lamps after a 5-second delay. If the request was from an IRTT, INTEST will simply release its work area.

If the CST value is acceptable, INTEST will form a communication frame with the LNI data from HTI and specifying an INO of Test Call C. The CCR Scheduler is scheduled with this information in the work area. Other specifications of this call are as follows:

( ) OM Maintenance to be scheduled in the event of malfunction, and
(2) Schedule on CCR ready interrupt.

A flag will be set in the HTI entry, indicating that a CCR request is in progress.

V73X03, LNTERM, will be scheduled if the associated CCR ready interrupt comes true, all translations are successful, and the path is available or a malfunction has occurred, V17X02, INTEST, will be scheduled if any other set of circumstances occur with respect to the test call.

LNTERM will make the decision as to whether a successful path was obtained or a malfunction occurred. In the event of a malfunction, LNTERM will schedule V17X02, INTEST.

Although the marker has yet to pull the orginating path, LNTERM will pass control to Call Processing if a path is obtained. Call Processing is scheduled with the Call History table, as the CCR handler would have done in the event of a true origination causing a CCR ready interrupt. Hence, any responses to the testman will be from Call Processing from that point in time. The next-program-to-schedule field in the Call History table is checked for a C32 identity; if found, that program will be scheduled rather than C01.

If a path is unavailable or a marker malfunction has occurred, INTEST will have been scheduled. The CCR processing flag is reset in the HTI entry, after first checking if it is presently reset.

If it is found reset, it means that a new termination has occurred during the OM test call and INTEST Will simply release.

A retry count is kept and if incrementing this counter causes it to exceed an assembly-defined constant, INTEST will release. Presently, retries for an LTA are limited to zero and an IRTT is limited to three retries. If the retry count is not exceeded, INTEST will make another attempt at pulling the path by sending the communication frames via the CCR, to an OM.

If the retries have expired, INTEST will simply release in the case of the IRTT retest. For an LTA, core table HLS will be updated, as discussed in Section 8.1.2. Lamplighter will be called to update the MDA, hence lighting the appropriate MTP tst indicator lamps. INTEST will then schedule INDRUM, via the timer queue, so as to extinguish these lamps after a 5-second delay.

9. TIMING AND STORAGE

9.1 INSTRUCTION STORAGE

| | |
|---|---|
| Instructions | 163 |
| Local Data | 0 |
| Total | 163 |

1. NAME

V73 — Line Number Terminating Data Retrieval (LNTERM) is the name of the line number terminating data retrieval program as shown in FIGS. 7 and 8 of the drawings.

2. PURPOSE

AN LTA/IRTT orgination may specify a line termination by Line Number Identity (LNI) rather than a Directory Number (See D3.571-05, "Valid Dialing Patterns from the MTP at the Maintenance and Control Center"). LNTERM will provide Call Processing with terminating data, normally retrieved from table CDN, when the LNI dialing pattern is used.

LNTERM also handles Originating Marker responses as a result of a test call made by INTEST (See FP-100365-MD).

3. FUNCTIONS (a) Converts the LNI dialing pattern from Telephone Binary Coded Decimal (TBCD) form to binary form on a per field basis.
(b) Range checks each field of the LNI.
(c) Verifies that the Line Matrix Inlet (LMI) identified by the LNI exists in the EAX office.
(d) Performs a drum associative search of table VRA to obtain the terminating junctor Trunk Group Number (TGN) for the specified LMI.
(e) Formats default CDN data with obtained TGN in Work Area overlay CXF as if a Directory Number translation had been performed by Call Processing.
(f) In response to the Originating Marker test call made by INTEST, LNTERM will determine if the test call was successful. If successful, LNTERM will schedule Call Processing as if a true origination had occurred in the network. If unsuccessful, LNTERM will schedule INTEST.

4. INPUTS 4.1 SOFTWARE 4.1.1 Work Area Overlays 4.1.1.1 The nine digits input by the testman from an LTA/IRTT are passed to LNTERM in work area overlay FWB.

4.1.1.2 Originating marker response to a test call is contained in overlay FWA. FWA contains error code information, RJ identity and CHT address.

4.1.1.3 Requested data from drum search of VRA is contained in overlay CXF. Error Code information is in FWA.

4.1.2 Core Tables 4.1.2.1 LNTERM accesses core table KDB to determine what AB groups are equipped for a given section and Line Matrix.

4.1.2.2 Core table FPD is accessed to retrieve drum address of VRA.

4.1.3 Drum Tables

Drum table VRA is accessed to determine the Trunk Group Number of the TJ's which allow access to the inputted LNI, 4.2 HARDWARE LNTERM indirectly accesses the drum through operating system programs.

5. OUTPUTS 5.1 SOFTWARE 5.1.1. Work Area Overlays 5.1.1.1 When accessing drum table VRA, drum search parameters are passed in FWA.

5.1.1.2 Overlay CXF will contain a default CDN entry (as if a Directory Number translation had been performed) when Call Processing is re-entered. FWA will contain an indicator as to the validity of the CXF data.

6. CONTROL 6.1 ENTRY POINTS

| Entry Points | Reason for Entry |
|---|---|
| V73XO1 | CO5 branches to this entry point when an LTA/IRTT testman origination has specified a line termination by LMI. LNTERM will validate LNI and set up drum search of table VRA. |
| V73XO2 | LNTERM is scheduled by the Drum Handler when a successful search of the Drum Table VRA has been performed. LNTERM will complete a default Directory Number translation for an LNI and pass control to Call Processing. |
| V73XO3 | This entry point handles Originating Marker responses as a result of a test call made by INTEST (V17).. If acceptable response, LNTERM will schedule Call Processing with the Call History Table; otherwise, it will schedule INTEST. |

6.2 EXIT POINTS

| Exit Points | Reason for Exit |
|---|---|
| E01X03 | LNTERM releases its work area and CP control if it has successfully scheduled Call Processing with the CHT. This is a result of an Originating Marker test call made by INTEST. |
| F35X01 | LNTERM branches directly to the Drum Manipulator to schedule the associative search of Drum table VRA. Success return is to V17X02 and error return to C31X01. |
| C15X02 | LNTERM branches directly to Call Processing, indicating successful or unsuccessful terminating data retrieval. Data is included if successful. |
| E01X06 | LNTERM reschedules V17X02 if the Originating Marker response to a test call made by INTEST (V17) is not proper for the scheduling of Call Processing. |

7. SUBROUTINES USED

| Entry Point | Functional Name |
|---|---|
| E01X01 | The ACCEPT entry line of the executive is used to schedule C01X01 with the Call History Table associated with an Originating Marker test call made by INTEST (V17). |

8. NARRATIVE

LNTERM supports Call Processing handling of outtesting of lines from an LTA/IRTT. LNTERM also supports the intesting of lines by INTEST. Hence, the discussion and technique are divided into these two areas.

8.1 DISCUSSION 8.1.1 Outtesting

There are two trunk types which are handled by Call Processing in a specialized manner so as to provide for manual testing of lines. These are the Line Test Access (LTA) and the Incoming Remote Test Trunk (IRTT). LTA's are located at the MTP whereas IRTT's handle remote test desks (4 wire signalling). LTA's and IRTT's appear as incoming trunk circuits on the trunk register matrix and selector matrix.

A testman can cause a Call for Service (CSFV) in the trunk register matrix by selecting the LTA via one of his test circuits (Primary, Aux, etc.). This will also cause the TCMF sending facility (Talk and Dial Pulse circuit, also) to be connected to the LTA trunk circuit. The CFSV will be handled as any other trunk origination in FAX. The OM will pull a path to an Incoming Register Junctor and control will be passed to Call Processing (CP). CP will perform a Class of Service translation for the origination. Data included in an LTA's class of service is:

(a) Originating Class Type (OCT) = Wire Chief, which allows for some special processing during this call.

(b) Intest Circuit Identity (INT) = A number (0–23) uniquely identifying the particular LTA or IRTT.

(c) Mode of Receive (MOR) = TCMF for LTA, which causes CP to connect a TCMF Receiver (d) Start Dial Signal (SDS) = Wink Start (WS)

(e) Non-Local Pretranslation Required, along with Collect Total of X digits (XTL) = 1, allows CP to set up and interpret the digits the testman will input.

After retrieving this COS data, CP will connect the receiver as specified and cause the WS SDS. Recognition of the above events for an LTA at the MTP is via lamps. An RJ holding the trunk matrix path will light the Busy lamp of the appropriate LTA and a WS signal will cause the input lamp to light on TCMF sending facility.

WS on an IRTT trunk will cause the removal of delay dial signal (reverse battery), and produce a visual indication at the remote test desk.

The RS is also instructed to collect one digit. After the testman inputs a digit, CP will setup to distinguish between the two dialing patterns available to define a line in the EAX office. The two patterns are a 7-digit Directory Number (DN) or a 9-digit LNI (Office Section, subsection, Matrix, AB Group, A-unit, A-unit inlet) of the line to be tested.

The RS is set up by CP to Fast Interdigital timing between digits 7 and 8 and to collect a total of 9 digits. After timing out (testman has inputted a DN) or collecting 9 digits (testman has inputted an LNI). CP determines which pattern was inputted by the number of digits input. In the DN case, analysis continues as any other normal call. If the 7 digits input are not a valid termination to a line within the office, appropriate action is taken (See following paragraph).

If an LNI was input, control is passed by CP to LNTERM, which translates the inputted LNI in digit form to its internal form and checks that the inputted LNI in digit form to its internal form and checks that the inputted digits specify a valid termination in the office. (See following paragraph for action taken when digit string is invalid). If the digit string is valid, LNTERM will retrieve a Trunk Group Number (TGN, used by CP to determine selector matrix outlets which can be used to access the specified line) and pass control back to CP as if it had performed a DN translation (the DN pattern would have taken that route). CP will now terminate this call.

Whenever CP cannot terminate an IRTT/LTA call, trunk reorder tone is given to the originating trunk. In the case of the LTA this will cause the BSY lamp to flash at 120 1PM. In cases where the testman has inputted an invalid digit string (i.e., an LNI with Office Section=2 when it does not exist or if a 3-digit office code (DN) is not a line termination in this office, etc.), CP will pass control to a maintenance program V99 (SOMTIN). If an LTA, V99 will light Test Indicator Lamp B4. For both LTA and IRTT, program module C32 will be called to give universal lockout to the incoming RJ (causes trunk reorder tone to be given by IRTT/LTA trunk circuit). Hence, the B4 Test Indicator Lamp indicates an input error when the testman is using an LTA. As a result of trunk reorder tone, the LTA busy lamp will flash at 120 1PM and the TCMF sending facility will disconnect (TCMF Connect Lamp, Input lamp, etc. will reflect this).

Messages output by CP for error conditions are not inhibited. Hence, hardware/software errors (i.e., Drum Translation problems) will be output if they occur. One message unique to handling an LTA/IRTT which may appear is CP IN 14, VRA, 4. This message would appear if no coincidence occurs when LNTERM (LNI digit pattern (was searching maintenance table VRA for a TGN value. Core table KDB implied a given Line Matrix is equipped but there is no corresponding entry in drum table VRA. This a data base error.

Since an LTA/IRTT is designated Wire Chief, some special processing occurs during the terminating phase by CP. Alternate routing, annoyance call termination action, and PBX scan considerations are ignored. Busy line override and metallic cut-thru are provided by requesting the TM to operate in Wire Chief mode. An additional feature of Wire Chief is that TM checks are made on the line circuit to which it is terminating.

Essentially, only the line which is given (LNI pattern) or the LNI obtained via the DN translation will be used for termination. The LNI pattern allows for termination to PBX lines which may only have a single DN.

Path blockage after retry will result in trunk reorder tone. If a termination is made to a line and a fault is detected, a CP message will be printed on the TTY (true also for normal calls). Termination to busy lines will result in CP giving a cut-thru type of 5 (C1 and C3 leads) to the LTA/IRTT trunk. (Non busy, only C1 is given). The LTA has circuits which, when enabled by C1 and C3 leads, will sense the busy/idle condition of the line to which it is If IF loop is present (busy), the Busy lamp will flash at 60 1PM: otherwise, lamp will be steady; if loop is removed, lamp will be steady; and even if loop is restored, lamp will remain steady. If only C1 lead is given, the Busy lamp will be steady, even if a loop later appears across the line. As in the case of trunk reorder tone being given, the TCMF Sending Facility will be dropped. For Test Desk indicators refer to the appropriate Test Panel description or Test Panel Test Procedures (i.e., Type 180L, Section 211-401-500 and Section 644-102-501 of of General System Practices.

8.1.2 Intesting

Whenever CP terminates an LTA/IRTT to a line, an entry is made in a core table NTI. Two words are reserved for each INT value between 0-23. The two words contain the Call Status Terminating (CST) and the LNI to which the particular LTA/IRTT is terminated and are used for Intesting. Once a path is established to a line, and the testman can perform a variety of tests.

Once connected to a line the testman can also perform an intest. Software support of an intest is given by module INTEST (V17). See FP-100365-MD.

LNTERM performs a supplementary task for INTEST, that of handling Originating Marker responses to the test call made by INTEST.

8.2 TECHNIQUE

8.2.1 Outtest Support

LNTERM receives control from Call Processing module C05 when a testman has inputted 9 digits. These nine digits are passed in the work area. LNTERM will convert the digits on a per field basis to their internal binary equivalents and make the following checks. Telephone Binary Coded zeroes have a value of zero.

D1 is digit one, etc.

| CONVERSION | VALIDITY |
|---|---|
| SEC = D1 | 1 ≤ SEC ≤ 2 |
| SBS = D2 | SBS = 1 |
| LMX = 10*D3+D4 | 1 ≤ LMX ≤ 10 |
| LAB = D5 | 0 < LAB ≤ Highest Equipped in SEC.LMX |
| LAU = 10*D6+D7 | 1 ≤ LAU ≤ 10 |
| LAI = 10*D8+D9 | 1 ≤ LAI ≤ 20 |

The highest equipped AB group in a given SEC.LMX is obtained from core table KDB. If any validity checks fail, LNTERM, will set FWRNCN in the work area and pass control to C15X02. This point is the normal entrance after Call Processing has performed a Directory Number search. FWANCN indicates non-coincidence on the search and hence the dialed digits specify an invalid termination.

When all digits are converted and validity checks are completed, LNTERM will have formatted the LNI in Work Area as it would appear in a CDN entry. Utilizing the SEC and LMX values inputted, LNTERM formats a search key to perform an associative search on MTP maintenance software table VRA. The table search is performed by exiting to the drum manipulator with appropriate data in the work area. The returned data will contain a Trunk Group Number (TGN), which is necessary to Call Processing to determine which selector outlet arrays of TJ's can be used to terminate at the LNI specified.

Request to MANIP is for table VRA associative search and one word transfer (access request number FM014). This request is an unrestricted associative search access. It is necessary to supply in the Work Area (FWA) the following information:

| | |
|---|---|
| FWANPG = V73 | Program to schedule on successful search |
| FWAELN = 2 | Entry line of NPG to schedule |
| FWAPRI = PC15B | Priority to schedule NPG |
| FWAFPR = C31 | Program to schedule on unsuccessful search |
| FWAFEL = 1 | Entry line of FPR to schedule |
| FWAFEP = PC31C | Priority to schedule FPR |
| FWAACM = 0 | Access Mode is Read |
| FWAMRN = | MANIP Request Number (FM973), consisting of bits indicating coincidence required and C31 is error handler |
| FWADCU = | DCU pair |
| FWASDA = CXFW03 | Work Area Address to put data |
| FWAESZ = 1 | Entry Size (to transfer) |
| FWACON = 0 | Control Bits (in search key) |
| FWAMXC = 1 | Maximum Coincidences |
| FWADAD = | Physical Drum Address |
| FWASEG = | Drum Segment |
| FWASW1 = | VRA search key |
| FWAMW1 = | Mask word for search key |

The TGN value obtained from the drum search will be added to the already formatted LNI information in the work area. The following items are also added to this formatted data.

Terminating Block Type (TBT) is set to 2 (regular local line): hence, LTA/IRTT will pass Call Processing blocking test.

Terminating Call Type (TCT) is set to 1 (single party line). Line Matrix Termination (LXT) is set to 1 since this is a line matrix termination.

All other fields of CDN are set to 0 since they are essentially irrevalent items to Call Processing when handling termination of an LTA/IRTT.

Control is then passed to C15X02 with FWANCN = 0 so that it will appear to C15 that a valid Directory Number translation had been performed.

In the event of non-coincidence or hardware error during drum search, C31X01 will be scheduled by the drum handler rather than LNTERM. C31X01 will output data indicating VRA as table being searched, indicating the error type. If non-coincidence occurs, the problem is a data base conflict between KD8 and VRA.

8.2.2 Intest Support

LNTERM is a drum resident program used as the success return program as a result of an Originating Marker test call made by INTEST (V17). Since the initial request is a maintenance call, marker malfunctions cause the scheduling of the success returns as well as a successfully completed Computer Communication Register (CCR) ready interrupt. LNTERM distinguishes between these two entry conditions be examining FWAE10.

If the reason for entry to LNTERM was a marker malfunction, LNTERM will schedule INTEST.

If the test call was successful, INTEST will calculate an offset address for the CHT and schedule C01X01 with the CHT appearing like a work area. The Call History Table address is returned by the CCR handler in FWACHT. The offset address is simply the bias between the beginning of FWA and beginning of the particular CHT+3 so that the CHT entry can be handled by the executive as if it were a work area. A work area type is also inserted in the CHT to complete its work area appearance.

Before insertion of the next-program-to-schedule (C01X01) in the appropriate CHT entry word, this word is checked for the identity of C32. If C32's identity is present, this word is left unchanged. The ACCEPT entry line of the executive is called to place the CHT on a scheduling queue. Hence either C32X03 or C01X01 would have been scheduled. The work area used by LNTERM is released to the operating system.

The C32 check is necessary to prevent the loss of an RJ and CHT entry from the system. If the C32 identity is found, it means that C32 was instructed to clear the associated RJ. C32 assumed that because of conditions reflected in the CHT (CHQIPS = 1 and CHQWAL = 0) that C01X01 had been scheduled by the CCR handler when the associated ready interrupt had occurred. Hence, the next program to run with respect to this call would have been C32X03. However, the CHT was respect to this call would have been C32X03. However, the CHT was not scheduled by the CCR handler, hence LNTERM keeps the Call Processing interface by making the check. Since C32 initially freezes the RJ it was requested to clear, entrance to the normal Call Processing thread at C01X01 would result in Call Processing waiting for an RJ interrupt which could never come true.

9. TIMING AND STORAGE

9.1 INSTRUCTION STORAGE

| | |
|---|---|
| Instructions | 167 |
| Local Data | 0 |
| Total | 167 |

What is claimed is:

1. In a communication switching system having switching network means for establishing connections between calling and called lines, register apparatus for receiving call processing information from a calling line via said switching network means, a pool of register junctors coupling said switching network means and the register apparatus for serving as inlets therefor through which are conveyed said information, a data processor means coupled to said register apparatus for performing testing operations on the system, a line testing arrangement comprising:

manual testing means for initiating tests of a selected line to be tested;

line testing adapting means coupled between said manual testing means and said switching network means and responsive to an initiation signal from said manual testing means for causing the establishment of a first connection to an idle one of the register junctors so that call processing information indicative of the selected line can be supplied from said testing means to the register apparatus for establishing a second connection to the selected line from said manual testing means which can then test said selected line; and logic means responsive to an in-test signal from said manual testing means for generating an interrupt signal and for supplying it to said processor means to request it to cause said switching network means to establish a third connection between said selected line to another one of said register junctors while maintaining said second connection between said adapting means and said selected line so that said manual testing means can perform in-testing operations.

2. A line testing arrangement according to claim 1, wherein said second connection and said third connection extend electrically in parallel to said selected line, whereby said testing means can communicate with the system.

3. A line testing arrangement according to claim 2, wherein said manual testing means comprises a plurality of manual test panels, each one of said panels including a plurality of manually controlled switches, one of said switches causing said initiation signal.

4. A line testing arrangement according to claim 3, wherein said line testing adapting means comprises a plurality of test adapter units, said units coupling said initiation signala to said logic means.

5. A line testing arrangement according to claim 4, wherein said logic means includes logic gates for extending said initiation signal.

* * * * *